(12) United States Patent
Abenaim et al.

(10) Patent No.: US 7,582,879 B2
(45) Date of Patent: Sep. 1, 2009

(54) MODULAR X-RAY MEASUREMENT SYSTEM

(75) Inventors: Daniel Abenaim, Lynnfield, MA (US); Martin Choquette, Exeter, NH (US); Ruvin Deych, Burlington, MA (US); Peter M. Howard, Arlington, MA (US); Remus M. Braescu, Chestnut Hill, MA (US)

(73) Assignee: Analogic Corporation, Peabody, MA (US)

( * ) Notice: Subject to any disclaimer, the term of this patent is extended or adjusted under 35 U.S.C. 154(b) by 0 days.

(21) Appl. No.: 11/728,486

(22) Filed: Mar. 26, 2007

(65) Prior Publication Data

US 2007/0221858 A1 Sep. 27, 2007

Related U.S. Application Data

(60) Provisional application No. 60/786,142, filed on Mar. 27, 2006.

(51) Int. Cl.
*G01T 1/20* (2006.01)

(52) U.S. Cl. .................................. 250/370.11

(58) Field of Classification Search ........................ 250/370.01–370.15; 378/98.8
See application file for complete search history.

(56) References Cited

U.S. PATENT DOCUMENTS

| | | | | |
|---|---|---|---|---|
| 5,753,921 A * | 5/1998 | Trauernicht et al. | ..... | 250/370.09 |
| 6,510,195 B1 * | 1/2003 | Chappo et al. | ................ | 378/19 |
| 6,700,948 B2 * | 3/2004 | Hoffman | ..................... | 378/19 |
| 2002/0181647 A1 * | 12/2002 | Venkataramani et al. | ...... | 378/19 |
| 2003/0234363 A1 * | 12/2003 | Sekine et al. | .......... | 250/370.11 |
| 2004/0061062 A1 * | 4/2004 | Chowdhury et al. | ... | 250/370.11 |
| 2004/0264631 A1 * | 12/2004 | Joshi et al. | ..................... | 378/19 |
| 2005/0061985 A1 * | 3/2005 | Hoffman | ............... | 250/370.01 |
| 2005/0167603 A1 * | 8/2005 | Hoffman | ............... | 250/370.11 |

* cited by examiner

*Primary Examiner*—David P Porta
*Assistant Examiner*—Kiho Kim
(74) *Attorney, Agent, or Firm*—McDermott Will & Emery LLP

(57) ABSTRACT

An x-ray detector assembly includes a first substrate and a second substrate. An array of photodetectors, which have coplanar contacts, are disposed on the top surface of the first substrate. The x-ray detector assembly further includes a plurality of x-ray scintillator elements arranged in an array. The photodetectors are aligned so as to match the array of x-ray scintillator elements. The second substrate is fused to the bottom surface of the first substrate. The second substrate provides on its distal side a planar connectivity pattern matched to electronics of a signal acquisition system. One or more through-hole connections traverse both substrates, and are configured to couple the contacts of the photodetectors from the top surface of the first substrate to the connectivity pattern on the distal side of the second substrate.

19 Claims, 9 Drawing Sheets

MODULAR X-RAY MEASUREMENT SYSTEM

CROSS REFERENCES TO RELATED APPLICATIONS

This application claims the benefit of priority under 35 U.S.C. §119(e) from commonly owned U.S. provisional patent application Ser. No. 60/786,142, entitled "Modular X-Ray Measurement System For CT Imaging," filed Mar. 27, 2006.

BACKGROUND

The current trend in x-ray computed tomography (CT) imaging is toward high speed volume imaging, which requires that a large number of slices be acquired simultaneously. Detector measurement systems (DMSS) for these purposes present many challenges, as the number of channels quickly moves from ten thousand to hundreds of thousands and beyond.

The advent of high integration measurement integrated circuits (ICs), which include about 64 to 256 channels per chip, allows the design of smaller self-contained modules that can be assembled in larger arrays in both the X- and the Z-directions. The challenges presented by such modules include transferring the regular connections of the diode array to the different connections required by the remaining components of the electronic circuitry, and protecting nearby electronic components from x-ray damage, and preventing the heat generated by the electronic components from affecting the detectors. Further challenges include building in the requisite mechanical accuracy, and designing a super-module that can easily be constructed.

There is a need for modular x-ray measurement systems and methods that can meet one or more of the above-described challenges.

SUMMARY

An x-ray detector assembly may include a plurality of x-ray scintillator elements arranged in an array, a first substrate, and a second substrate. An array of photodetectors, which have coplanar contacts, is disposed on the top surface of the first substrate. The array of photodetectors is aligned so as to match the array of x-ray scintillator elements. The second substrate is fused to the bottom surface of the first substrate, and provides on its distal side a planar connectivity pattern matched to signal acquisition electronics. One or more through-hole connections traverse both substrates, and are configured to couple the contacts of the photodetectors from the top surface of the first substrate to the connectivity pattern on the distal side of the second substrate.

DETAILED DESCRIPTION

Figure 1A:
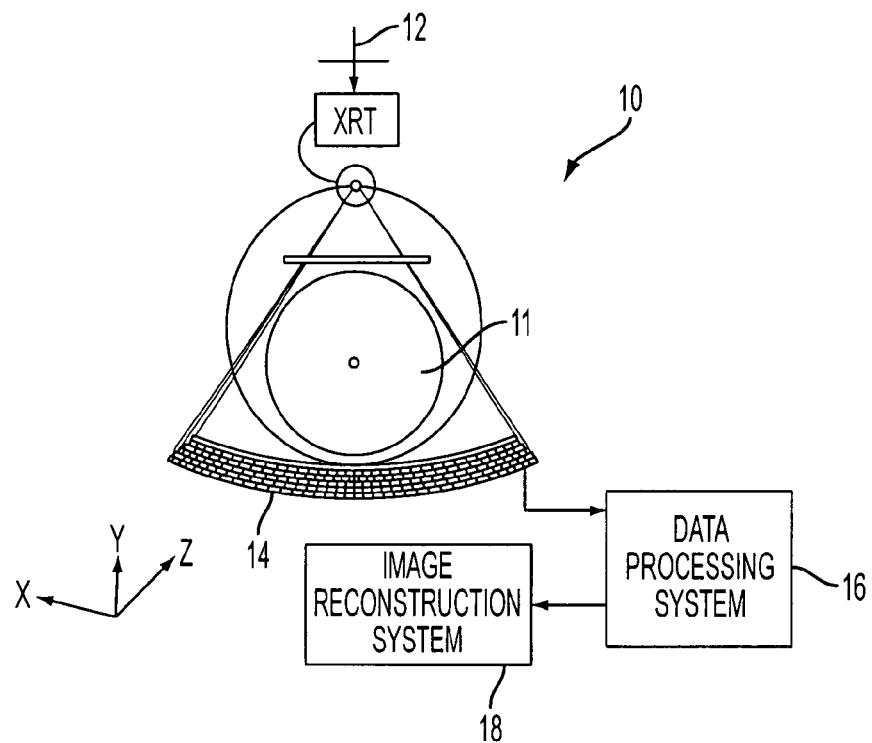
FIG. 1A is a schematic functional diagram of a conventional multi-row detector array for a CT imaging system.

FIG. 1A is a schematic functional diagram of a conventional multi-row detector array for a CT imaging system 10. A CT imaging system allows an image of the internal structure of a target object 11 to be generated, one cross-sectional slice at a time, by irradiating with x-rays the slices of the target object, from many directions.

In overview, the CT imaging system 10 includes an x-ray source 12, a multi-row x-ray detector array 14, a signal acquisition system 16, and an image reconstruction system 18. The x-ray source 12 generates x-rays which pass through the target object 11, which may typically be an anatomical region of a patient, for example. The x-ray detector array 14 detects the x-rays that have passed through the target object 11, and generates detection signals indicative of the attenuated intensities of the x-rays that have traversed the target object. The signal acquisition system 16 digitizes and processes these detection signals. The processed signals are then sent to the image reconstruction system 18, which implements image processing techniques to reconstruct a tomographic image of the target object 11.

The x-ray source 12 may be a conventional x-ray tube (XRT), for example. The x-ray source 12 generates x-rays from a focal spot of the XRT. These x-rays are typically collimated before the x-rays irradiate the target object 11. The x-ray detector array 14 is an array of individual x-ray detector elements, for example solid-state detectors consisting of scintillators and photodetectors. When photodetectors are used, the x-rays that have traversed the target object 11 first go through scintillators, which convert the incident x-rays into visible light. The photodetectors receive the visible light generated by the scintillators, and generate electrical signals responsive to the visible light received from the scintillators. X-ray detector elements other than scintillators and photodetectors may also be used in different embodiments of the present disclosure. Typically, the photodetectors are photodiodes.

Figure 1B:
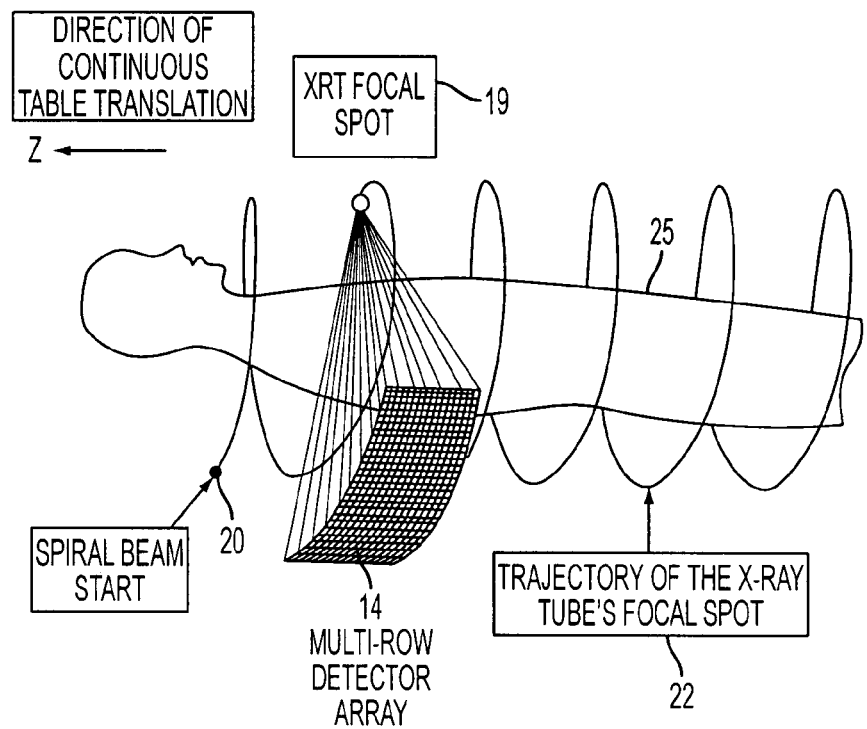
FIG. 1B is a schematic functional diagram of a helical CT scanner.

FIG. 1B is a schematic functional diagram of a helical CT scanner. In a helical CT scanner, the patient 25 is translated (typically at a constant speed), while the x-ray source and the detector array 14 rotate around the patient. As the patient is moving, the data for a prescribed number of axial slices of the target object is acquired. As seen from FIG. 1B, the trajectory 22 of the x-ray tube focal spot 19 maps out a helix.

In FIGS. 1A and 1B, the z-axis indicates the axial direction along which the multiple slices of the target object 11 are taken, while the x-axis is one of the coordinates of the plane in which the array of x-ray detector elements are disposed. As seen from FIGS. 1A and 1B, a conventional multi-row detector array has x-ray detector elements that are modularized along the x-direction. Typically, a module may include 16, 24 or 32 pixels, and 2 or 3 dozen modules may be contained per arc.

When the number of slices in CT systems is on the order of 16, 32, and 64, modularity in the z-direction may not be necessary. As the number of slices approaches several hundred, however, with four or five thousand pixels per module, modularizing along the z-direction as well as along the x-direction may be required.

Figure 2:
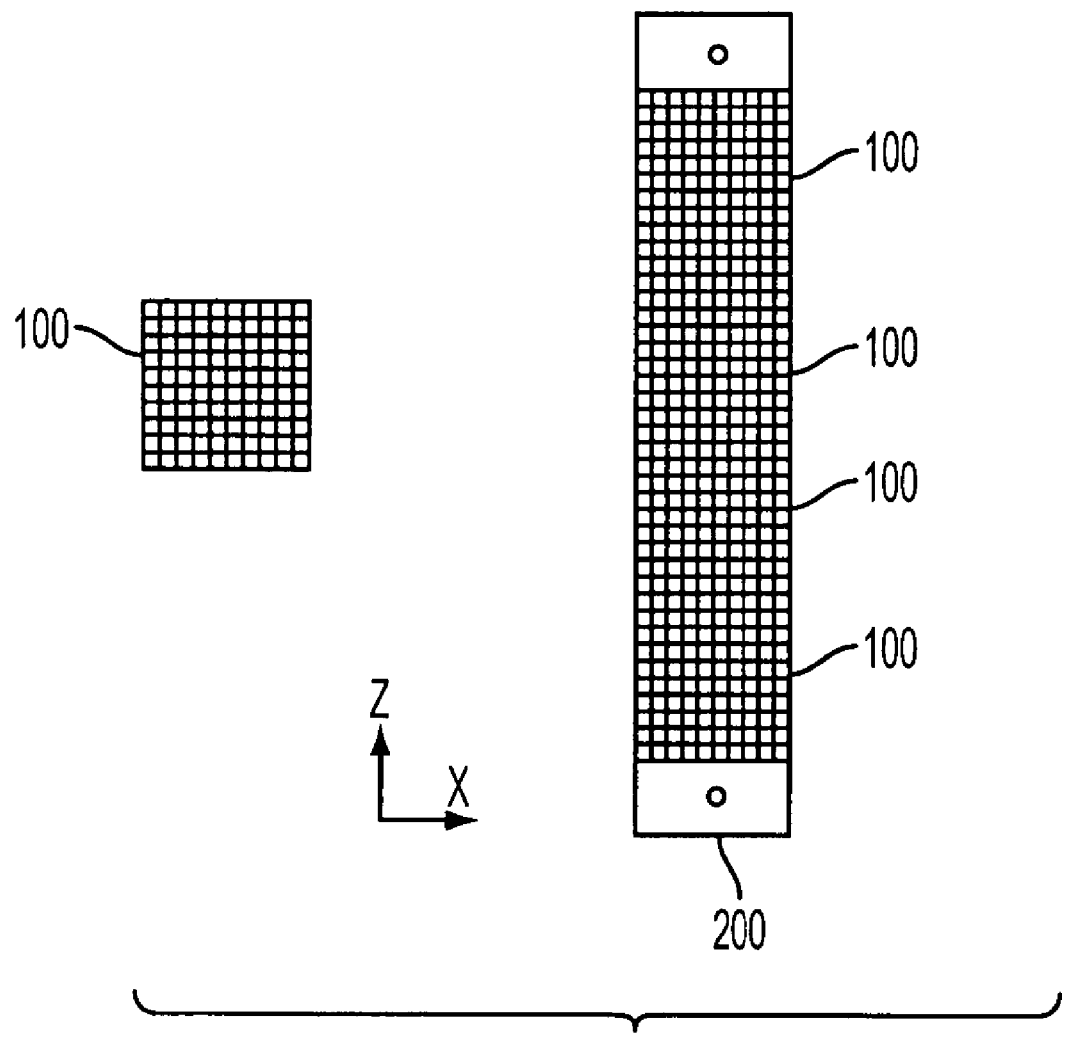
FIG. 2 illustrates a multi-row DMS array that is modular in both the X- and the Z-directions.

FIG. 2 illustrates a multi-row DMS array 200 that is modular in both the x- and the z-directions. A planar array 100 of x-ray detector elements is shown as being modularized along the x-direction. The array 200 includes a number of such modules 100, stacked along the z-direction.

Figure 3:
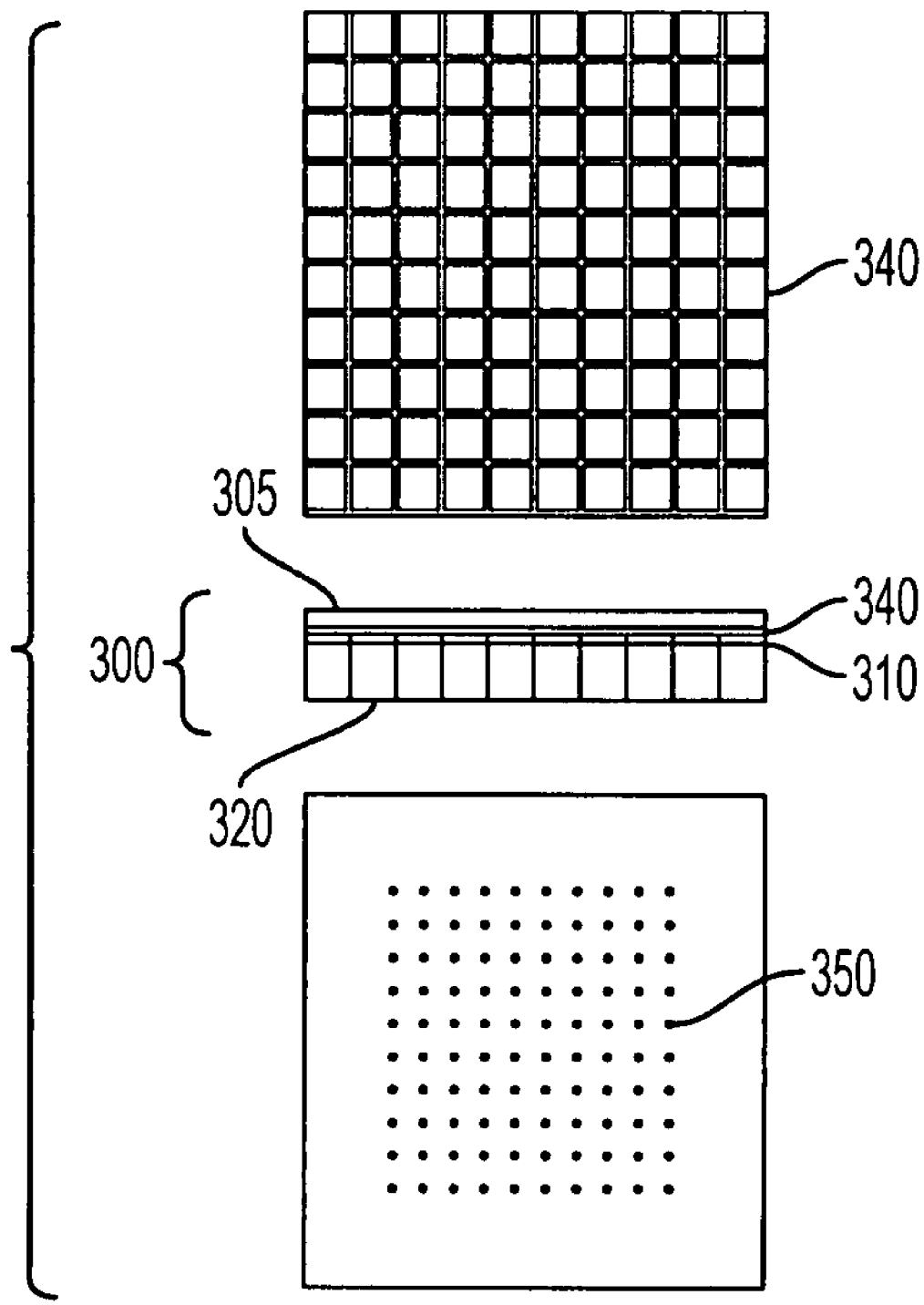
FIG. 3 illustrates an integrated photodetector array, in accordance with one embodiment of the present disclosure.

FIG. 3 illustrates an integrated x-ray photodetector assembly 300, in accordance with one embodiment of the present disclosure. The photodetector assembly 300 includes a plurality of x-ray scintillator elements arranged in an array 305, an array of N photodetectors 340, a first substrate 310, and a second substrate 320.

The photodetector array 340 is arranged on a top surface of the first substrate 310. In the illustrated embodiment, N=256, although in other embodiments other values of N may be used. The plurality N of photodetectors completely cover the entire area of the top surface of the first substrate 310. The array of N photodetectors have coplanar contacts, and are aligned so as to match the array 305 of x-ray scintillator elements. The arrays 305 and 340 are shown to be two-dimensional arrays, and substantially rectangular or square in shape. In different embodiments of the present disclosure, these arrays may be one-dimensional. They may also have different shapes, for example be substantially circular arrays.

The second substrate 320 is fused to the bottom surface of the first substrate 310 to form a monolithic photodetector array with back contact. The second substrate 320 provides on its distal (or bottom) side a planar connectivity pattern 350 that is matched to the electronics in a signal acquisition system, such as shown in FIG. 1A. One or more through-hole connections traverse both substrates, and couple the planar contacts of the photodetectors from the top surface of the first substrate 310 to the connectivity pattern on the distal side of the second substrate 320.

The integrated photodetector array 300 is thus formed of two separate but fused silicon substrates that are connected by the through-hole connections that bring the top surface of the first substrate 310 to the distal or bottom side of the second substrate 320. The top surface of the first substrate 310 contains the photodetector array 340, while the distal side of the second substrate 320 has the connectivity pattern 350 in a layer.

In this way, creating a connection plane on the other side of the photodiode array, and using a multilayer substrate to translate this pattern into another pattern suitable for electronic connection, is not necessary. The array 340 of photodetectors is connected from one plane (the surface of the first substrate) to another plane (the distal side of the second substrate) in a different size.

Figure 4A:
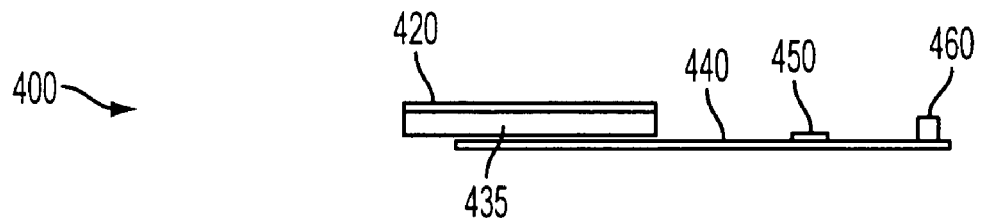
FIGS. 4A-4C illustrate x-ray detector assemblies that include one or more signal acquisition systems to an integrated diode array.
Figure 4B:
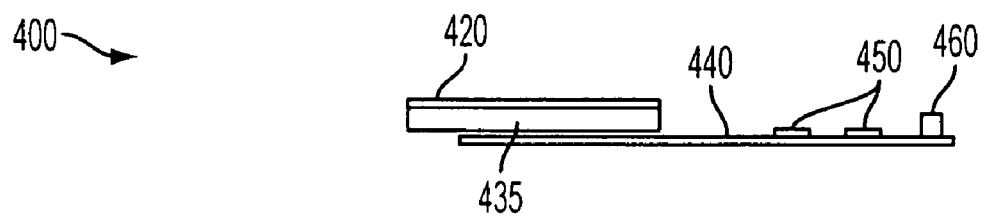
Figure 4C:
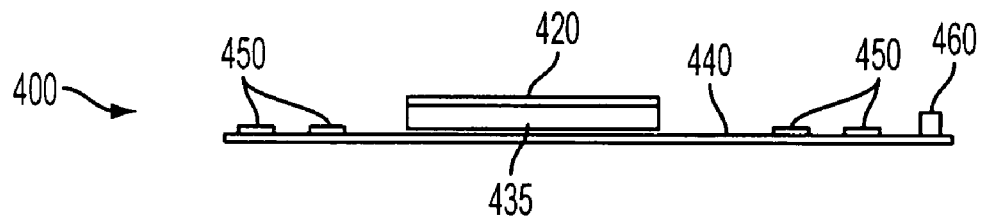

FIGS. 4A-4C illustrate an x-ray detector assembly 400, which includes one or more signal acquisition systems 450 in addition to an integrated photodetector array 435 that is constructed and arranged as described in conjunction with FIG. 3. The integrated photodetector array 435 includes a first (upper) substrate on a top surface of which an array 420 of photodetectors is arranged, and a second (lower) substrate that is fused to the first substrate. The second substrate has arranged thereon a layer containing a planar connectivity pattern. The signal acquisition system 450 is connected to the photodetectors 420 in the first substrate of the integrated array 435 through the connectivity pattern on the second substrate of the integrated array 435 and a flexible circuit 440. The signal acquisition system 450 is configured to digitize and process the electrical signals, which are produced by the array of photodetectors upon detection of x-rays that have been converted into visible light by the scintillators.

In the illustrated embodiments, the signal acquisition system 450 includes 256 channel data acquisition ASICs (Application Specific Integrated Circuits), although other embodiments of the present disclosure may use signal acquisition systems other than the data acquisition ASICs that are illustrated in FIGS. 4A-4C. In each x-ray detector assembly, the ASICs are electrically connected to the integrated diode array 430 via a flexible circuit (or cable) 440. An opposite end of the circuit (or cable) 440 has a connector 460 that is configured to connect data, control and power lines to the next level assembly of a multi-detector module.

In one embodiment, the ASICs may be flip chip soldered to the flexible cable 440. In another embodiment, the ASICs may be wired bonded to the flexible cable 440. Other methods of electrically connecting the ASICs may also be used, in different embodiments of the present disclosure.

In one embodiment, the photodetectors in the array 420 may be multiplexed in such a way that multiple photodetectors share a common interconnection to the signal acquisition system 450. In this way, connectivity is minimized, and the electrical signals generated by the photodetectors in the array 420 may be read sequentially, obviating the need to connect to all of the photodetectors and reading them together. The multiplexed photodetectors in the array 420 may be read a row-by-row manner or a column-by-column manner, for example, with many channels multiplexed to fewer A/Ds (analog/digital converters) in the ASICs. Multiplexing is one way of solving the problems caused by the many connections and the many slices in modern CT systems, in which thousands of connections are found within a very small space.

Figure 5:
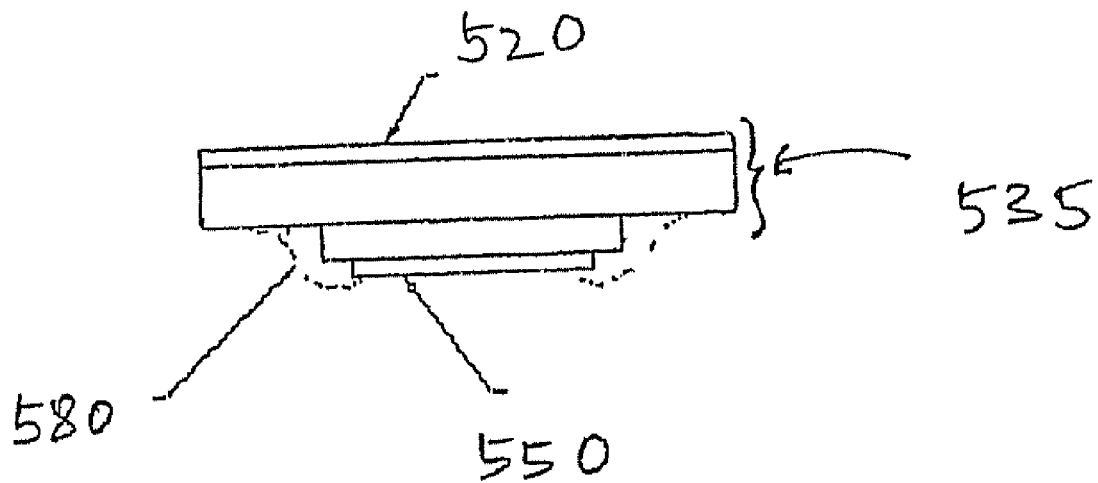
FIG. 5 illustrates a direct assembly method for connecting the photodetector array to the ASIC chip via wire bonding.

FIG. 5 illustrates an x-ray detector assembly 500 that has been assembled using a direct assembly method. This method connects a photodetector array to the ASIC chips via wire bonding in such a that an x-ray shield can be interposed to protect the measurement electronics from the effects of ASICs. The x-ray detector assembly 500 includes an integrated photodetector array 535, which includes a photodetector array 520 arranged on a first (upper) substrate of the integrated array 535, and a second (lower) substrate fused to the first substrate.

In the embodiment illustrated in FIG. 5, a planar connectivity pattern is arranged on an outer edge of the second substrate, rather than on one side of the lower substrate. The reason for moving the wiring connection pattern to the sides is to allow for wire bonding of the ASIC 550. The ASIC 550 is wire bonded to the lower substrate via wire bonds 580. An x-ray absorbing element 550 is disposed between the second substrate of the integrated array 535 and the ASIC, so as to shield the detector electronics from exposure to x-rays. The assembly technique described in conjunction with FIG. 5 can be used for more than one ASIC.

Figure 6:
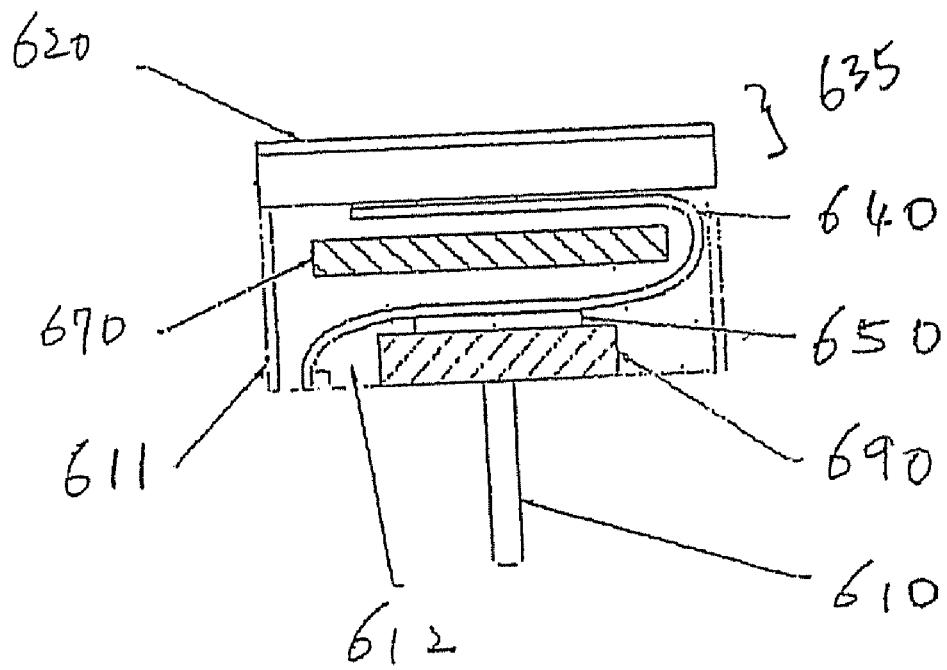
FIG. 6 illustrates an assembled module using the subassembly shown in FIG. 4.

FIG. 6 shows an x-ray detector assembly 600, which is an assembled module that uses the sub-assembly shown in FIG. 4. The x-ray detector assembly 600 includes an integrated photodetector array 635. The integrated array 635 includes an array 620 of photodetectors arranged on a top surface of a first substrate, and a second substrate that has a layer containing a planar connectivity pattern, and that is fused to the first substrate. An ASIC (or other type of signal acquisition system) 650 is connected to the electrical wiring pattern in the second substrate of the integrated array 635 via a flexible circuit board (or cable) 640.

An x-ray absorbing element 670 is disposed between the second substrate and the ASIC so as to shield the detector electronics from exposure to x-rays. A heat sink 690 is connected to the signal acquisition system, and is configured to conduct heat away from the x-ray detector assembly 600. As shown in FIG. 6, the x-ray absorbing element 670 is spaced apart from both the second substrate and from the detector electronics (i.e. ASICs) so as to thermally isolate the photodetectors and scintillators from heat generated by the detector electronics.

The flexible circuit board 640 shown in FIG. 6 has a folded configuration, in order to allow for a number of features. One feature is enabling all the electronics and outside connectivity to be entirely within the area of the photodetector array, for 2D tiling. Another feature is allowing the x-ray shield to be interposed, so that the electronics can be protected from the x-rays. Another feature is allowing for space within the assembled module 600 to insulate the photodiode array and scintillator assembly from the heat generated by the electronic. Yet another feature is providing the heat sink 690 to conduct the heat away from the detector assembly 600, and to provide a way of attaching the assembled module 600 to the next level assembly, i.e. to a super-module.

Yet another feature relates to a precision molded enclosure 611 which is glued to the integrated array 635, and which encloses the remaining components of the assembly 600, prior to resin filling. A filling resin 612 may fill the space within the assembled module 600. A mounting element 610, e.g. a mounting stud, is configured to mount the assembled module 600 to a desired location, for example onto the next level of assembly for a super-module. The enclosing and mounting of the module 600 may be done with sufficient accuracy to allow easy and accurate assembly of super-modules in the x- and z-directions.

Figure 7:
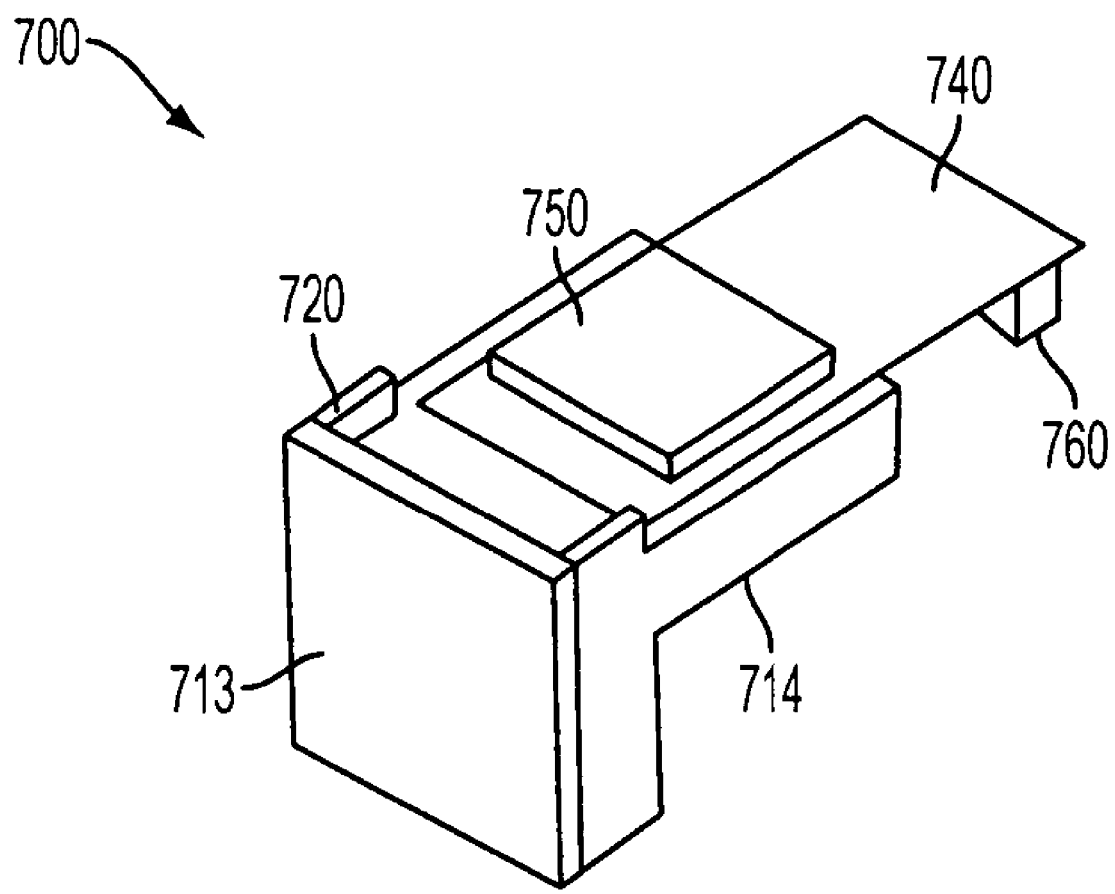
FIG. 7 illustrates another method of assembling the module shown in FIG. 6.

FIG. 7 shows another method of assembling an x-ray detector module 700, using less integration. In the embodiment illustrated in FIG. 7, the ASIC 750 is spaced apart from the photodetector array 720 by a distance sufficient to substantially reduce the effects of the heat generated by the ASIC 750. The ASIC 750 is also spaced apart so that the ASIC is protected from the incident x-rays by appropriately located x-ray absorbing material. The x-rays are converted to visible light by the scintillator block 713. In the embodiment illustrated in FIG. 7, an L-shaped module block 714 is used, although different embodiments may use differently shaped and sized module blocks.

Figure 8:
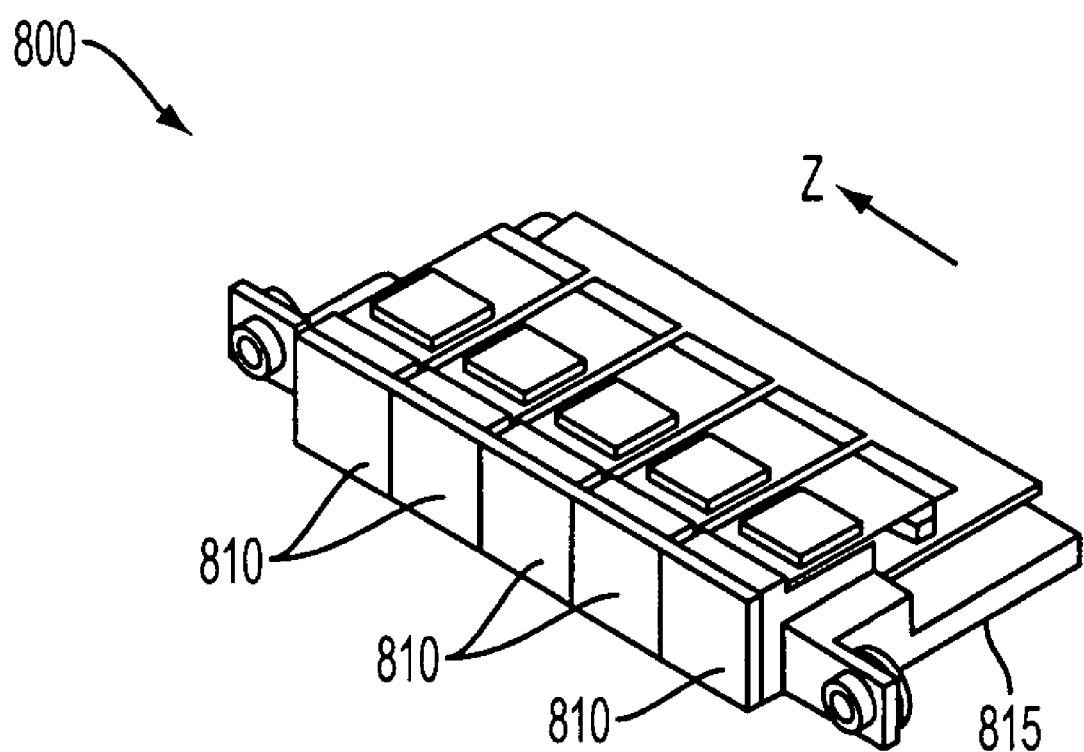
FIG. 8 shows one embodiment of a super module that is modular in the Z direction, as well as in the X-direction.

FIG. 8 illustrates a super-module 800, namely an x-ray detection system that is modular in both the x- and the z-directions. The super-module 800 includes a plurality of x-ray detector assemblies 810, connected to each other along the z-direction and aligned to each other. The component x-ray detector modules 810 are constructed and arranged in a manner similar to the modules 700 described in conjunction with FIG. 7, i.e. are each mounted on a module block. A super-module support 815 supports the individual component modules 810/

Figure 9:
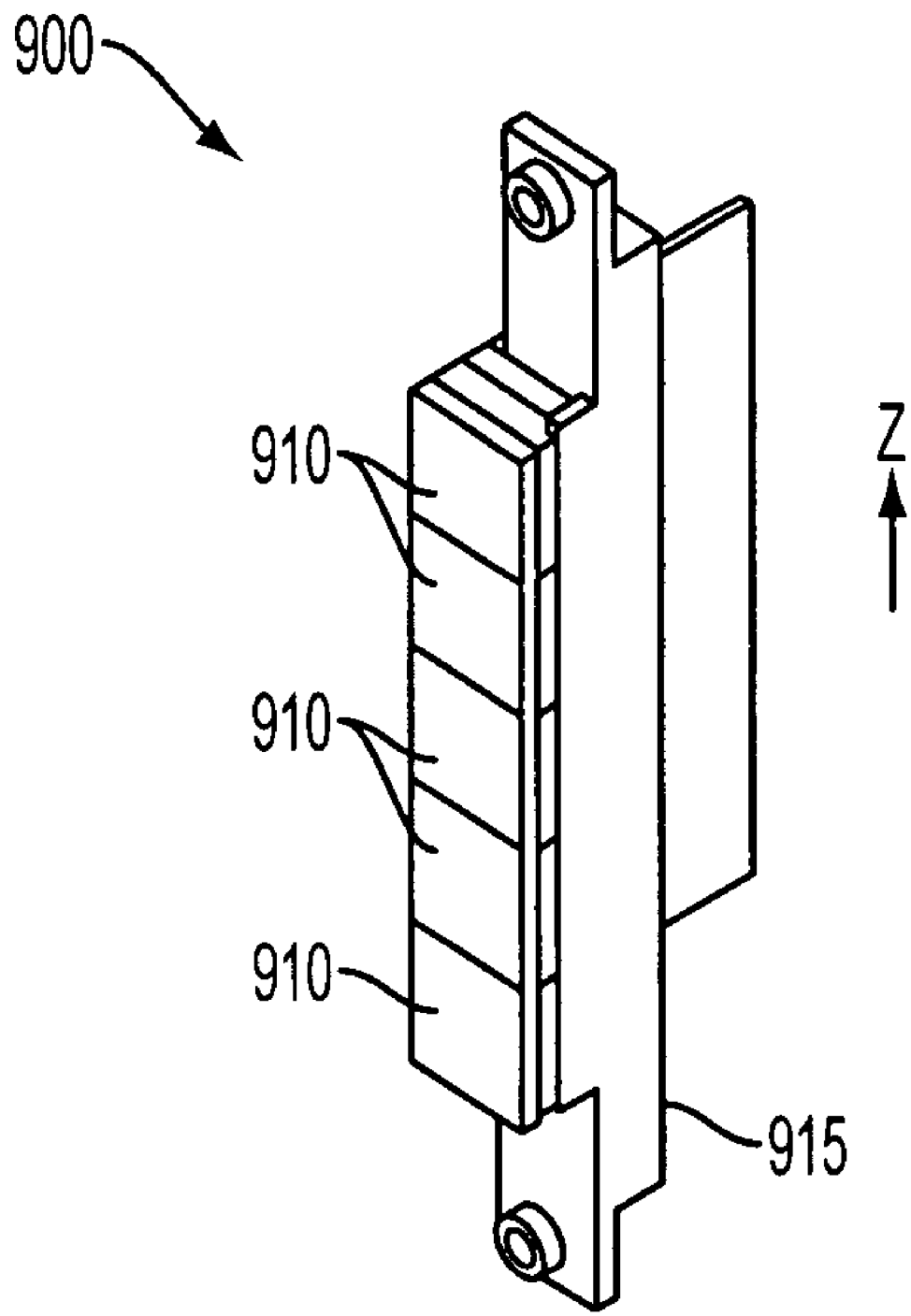
FIG. 9 shows another embodiment of a super module that is modular in the Z direction, as well as in the X-direction.

FIG. 9 illustrates a different configuration for assembling a super module 900 in the z-direction. In this embodiment, the component modules 910 are mounted on a vertical mounting stud, and are constructed and arranged in a manner similar to the modules 600 described in conjunction with FIG. 6. A super module support 915 supports the component modules 910.

Different types of super-modules may be built using different configurations, and different component modules. As one example, another type of super-module (not illustrated) may be assembled from one of the subassemblies shown in FIG. 4. In that case the x-ray protection and the heat sinking is global rather than modular.

In sum, methods and systems have been described that address the challenges caused by large arrays of photodetectors in modern x-ray measurement systems. Connectivity has been provided between an array of components in one plane to another plane in a different size. Thermal management and x-ray shielding have also been described. Finally, efficient packaging methods for assembling component modules have been described.

While certain embodiments have been described of modular x-ray measurement systems and methods, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An x-ray detector assembly comprising:
   a plurality of x-ray scintillator elements arranged in an array;
   a first silicon substrate having a top surface and a bottom surface;
   a front-illuminated array of photodetectors disposed on the top surface of the first silicon substrate and having coplanar contacts, the array of photodetectors aligned so as to match the array of x-ray scintillator elements;
   a second silicon substrate fused to the bottom surface of the first silicon substrate, the second silicon substrate providing on its distal side a planar connectivity pattern matched to electronics in a signal acquisition system; and
   one or more through-hole connections that traverse both silicon substrates so as to connect the top surface of the first silicon substrate to said distal side of the second silicon substrate, the through-hole connections configured to couple the contacts of the photodetectors from the top surface of the first silicon substrate to the connectivity pattern on the distal side of the second silicon substrate.

2. The x-ray detector assembly of claim 1, wherein the array comprises at least one of: a one dimensional array; a two dimensional array; a substantially rectangular array; a substantially square array; and a substantially circular array.

3. The x-ray detector assembly of claim 2, wherein the signal acquisition system is configured to process the electrical signals generated by the array of photodetectors, and wherein the signal acquisition system comprises at least one data acquisition ASIC (Application Specific Integrated Circuit).

4. The x-ray detector assembly of claim 3, wherein the signal acquisition system is connected to the photodetectors and to the planar connectivity pattern by a flexible circuit.

5. The x-ray detector assembly of claim 4, wherein the signal acquisition system is flip chip soldered to the flexible circuit.

6. The x-ray detector assembly of claim 5, wherein the signal acquisition system is wire bonded to the flexible circuit.

7. The x-ray detector assembly of claim 3, wherein the photodetectors are multiplexed so that multiple photodetectors within the array share a common interconnection to the signal acquisition system.

8. The x-ray detector assembly of claim 7, wherein the photodetectors are multiplexed in such a way that electrical signals from the photodetectors can be read sequentially in a row-by-row manner or a column-by-column manner.

9. An x-ray detector assembly comprising:
a plurality of x-ray scintillator elements arranged in an array;
a first silicon substrate having a top surface and a bottom surface;
a front-illuminated array of photodetectors disposed on the top surface of the first silicon substrate and having coplanar contacts, the array of photodetectors aligned so as to match the array of x-ray scintillator elements;
a second silicon substrate fused to the bottom surface of the first silicon substrate, the second silicon substrate providing on its distal side a planar connectivity pattern matched to electronics in a signal acquisition system, wherein the signal acquisition system is contained in an integrated chip that is wire bonded to the second substrate;
an x-ray absorbing element disposed between the second silicon substrate and the signal acquisition system so as to shield the electronics in the signal acquisition system from exposure to x-rays; and
wiring extending around at least one side of the x-ray absorbing element and connected to the electronics in the signal acquisition system on one side of the x-ray absorbing element, and connected to desired locations on the connectivity pattern on the other side of the x-ray absorbing element so as to insure connectivity between the electronics and the connectivity pattern and that all connectivity is disposed between adjacent components.

10. An x-ray detector assembly according to claim 9, wherein the wiring comprises
a flexible circuit.

11. The x-ray detector assembly of claim 10, wherein the x-ray absorbing element is spaced apart from the second silicon substrate and from the signal acquisition system so as to thermally isolate the array of photodetectors and the plurality of scintillators from heat generated by the electronics in the signal acquisition system.

12. The x-ray detector assembly of claim 10, further comprising:
a heat sink connected to the signal acquisition system and configured to conduct heat away from the x-ray detector assembly.

13. The x-ray detector assembly of claim 12, further comprising:
an enclosure that encloses the scintillators, the first silicon substrate, the second silicon substrate, the signal acquisition system, the x-ray absorbing element, and the heat sink within a single module.

14. An x-ray detection system, comprising:
a plurality of x-ray detector assemblies connected to each other, each x-ray detector assembly comprising:
a plurality of x-ray scintillator elements arranged in an array;
a first silicon substrate having a top surface and a bottom surface;
a front-illuminated array of photodetectors disposed on the top surface of the first silicon substrate and having coplanar contacts, the array of photodetectors aligned so as to match the array of x-ray scintillator elements;
a second silicon substrate fused to the bottom surface of the first silicon substrate, the second substrate providing on its distal side a planar connectivity pattern matched to electronics in a signal acquisition system, wherein the signal acquisition system is connected to the planar connectivity pattern by a flexible circuit;
one or more through-hole connections that traverse both silicon substrates and are configured to couple the contacts of the photodetectors from the top surface of the first silicon substrate to the connectivity pattern on the distal side of the second silicon substrate;
an x-ray absorbing element disposed between the second silicon substrate and the data processing system to shield the data processing system from exposure to x-rays, the x-ray absorbing element spaced apart from the second silicon substrate and from the data processing system to thermally isolate the array of photodiodes and the plurality of scintillators from heat generated by the signal acquisition system; and
a heat sink connected to the signal acquisition system.

15. The x-ray detection system of claim 14, wherein the signal acquisition system comprises at least one data acquisition ASIC.

16. The x-ray detection system of claim 14, wherein each one of the x-ray detector assemblies are aligned with respect to each other.

17. An x-ray detection system, comprising:
a plurality of x-ray detector assemblies connected to each other, each x-ray detector assembly comprising:
a plurality of x-ray scintillator elements arranged in an array;
a first silicon substrate having a top surface and a bottom surface;
a front-illuminated array of photodetectors disposed on the top surface of the first silicon substrate and having coplanar contacts, the array of photodetectors aligned so as to match the array of x-ray scintillator elements;
a second silicon substrate fused to the bottom surface of the first silicon substrate, the second substrate providing on its distal side a planar connectivity pattern matched to electronics in a signal acquisition system; and
one or more through-hole connections that traverse both silicon substrates and are configured to couple the contacts of the photodetectors from the top surface of the first silicon substrate to the connectivity pattern on the distal side of the second silicon substrate.

18. An x-ray imaging system for generating an x-ray image of an object, the x-ray imaging system comprising:
A) an x-ray detector assembly configured to detect x-rays that have traversed the object, and to generate electrical signals in response to the detected x-rays, wherein the x-ray detector assembly includes:
a plurality of x-ray scintillator elements arranged in an array;
a first silicon substrate having a top surface and a bottom surface;
a front-illuminated array of photodetectors disposed on the top surface of the first silicon substrate and having coplanar contacts, the array of photodetectors aligned so as to match the array of x-ray scintillator elements;
a second silicon substrate fused to the bottom surface of the first silicon substrate, the second silicon substrate providing on its distal side a planar connectivity pattern matched to a signal acquisition system; and one or more through-hole connections that traverse both silicon substrates and are configured to couple the contacts of the photodetectors from the top surface of the first silicon substrate to the connectivity pattern on the distal side of the second silicon substrate; and B) an image reconstruction system configured to reconstruct images from the electrical signals processed by the signal acquisition system.

19. The x-ray imaging system of claim 18, comprising a CT (computed tomography) imaging system.

* * * * *